United States Patent
Park et al.

(10) Patent No.: US 9,523,769 B2
(45) Date of Patent: Dec. 20, 2016

(54) ALIGNMENT METHOD AND SYSTEM FOR RADAR OF VEHICLE

(75) Inventors: Byung Kwon Park, Gyeonggi-do (KR); Kuk Ki Im, Gyeonggi-do (KR); Hyun Chang Ahn, Gyeonggi-do (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 869 days.

(21) Appl. No.: 13/215,849

(22) Filed: Aug. 23, 2011

(65) Prior Publication Data
US 2012/0235851 A1    Sep. 20, 2012

(30) Foreign Application Priority Data

Mar. 17, 2011  (KR) .................. 10-2011-0024043
Mar. 17, 2011  (KR) .................. 10-2011-0024044

(51) Int. Cl.
| | | |
|---|---|---|
| *G01S 13/00* | (2006.01) | |
| *G01S 13/93* | (2006.01) | |
| *G01S 7/40* | (2006.01) | |
| *G01S 13/34* | (2006.01) | |
| *G01S 13/40* | (2006.01) | |

(52) U.S. Cl.
CPC ............ *G01S 13/931* (2013.01); *G01S 7/4026* (2013.01); *G01S 7/4052* (2013.01); *G01S 13/34* (2013.01); *G01S 13/40* (2013.01); *G01S 2007/403* (2013.01); *G01S 2007/4034* (2013.01); *G01S 2007/4091* (2013.01); *G01S 2013/9321* (2013.01); *G01S 2013/9375* (2013.01)

(58) Field of Classification Search
CPC ........ G01S 13/34; G01S 13/40; G01S 13/391; G01S 7/4026; G01S 7/4052; G01S 2007/4034; G01S 2007/403; G01S 2007/4091; G01S 2013/9375; G01S 2013/9231
USPC .......................................... 342/70
See application file for complete search history.

(56) References Cited

U.S. PATENT DOCUMENTS

| | | | |
|---|---|---|---|
| 7,327,308 B2* | 2/2008 | Cheng ................. | G01S 7/4056 342/101 |
| 2004/0117090 A1* | 6/2004 | Samukawa et al. ............ 701/45 | |
| 2005/0116854 A1* | 6/2005 | Beez et al. ...................... 342/70 | |
| 2007/0182623 A1* | 8/2007 | Zeng et al. .................... 342/174 | |

FOREIGN PATENT DOCUMENTS

| | | |
|---|---|---|
| CN | 10-1788659 A | 7/2010 |
| JP | 2000-056020 A | 2/2000 |
| JP | 2005-518544 A | 6/2005 |
| JP | 2006-047140 A | 2/2006 |
| KR | 10-2010-0086422 A | 7/2010 |
| KR | 1020100086422   * | 7/2010 |
| WO | WO-03-062852 A1 | 7/2003 |

OTHER PUBLICATIONS

Office Action by Korean Intellectual Property Office on KR10-2011-0024943 dated May 27, 2012.*

* cited by examiner

*Primary Examiner* — Frank J McGue
(74) *Attorney, Agent, or Firm* — Saliwanchik, Lloyd & Eisenschenk (57) ABSTRACT

A vertical alignment method for a radar of a vehicle includes the steps of radiating radio wave to a forward ground by a radar which is installed on the vehicle; receiving reflected wave which is reflected from the ground; and determining whether or not a vertical misalignment of the radar occurs, based on the reflected wave.

17 Claims, 7 Drawing Sheets

ALIGNMENT METHOD AND SYSTEM FOR RADAR OF VEHICLE

CROSS-REFERENCE TO RELATED APPLICATIONS

This application claims the benefit under 35 U.S.C. §119 of Korean Patent Application Nos. 10-2011-0024043 and 10-2011-0024044, filed on Mar. 17, 2011, in the Korean Intellectual Property Office, which are hereby incorporated by reference in their entirety.

BACKGROUND

Exemplary embodiments of the present invention relate to an alignment method and system for a radar of a vehicle, and more particularly, to an alignment method and system for a radar of a vehicle, which can automatically detect a vertical or horizontal misalignment of a radar mounted to a vehicle.

In general, an adaptive cruise control (ACC) system of a vehicle is adapted to automatically control a throttle valve, a brake, a transmission, etc. of the vehicle based on a position of and a distance to a preceding vehicle that are detected from a radar mounted to a front part of the vehicle, to thereby appropriately perform acceleration and deceleration and maintain an appropriate distance to the preceding vehicle.

In the adaptive cruise control system, because the radar is mounted to a front end module of the vehicle and detect a position of and a distance to a preceding vehicle, alignment for the directionality of the radar and analysis for a coordinate value are regarded very important in adaptive cruise control.

However, in the conventional art, a problem is caused in that, when a directionality issue of the radar mounted to the vehicle occurs and in particular misalignment of the radar occurs in a horizontal or vertical direction with respect to the ground, it is difficult to detect automatically and effectively the misalignment and alarm a driver. Accordingly, in the conventional art, even in the case where erroneous travel information for the preceding vehicle is provided due to the misalignment of the radar in the horizontal or vertical direction, it is impossible for a driver to verify whether the information is correct or not, and thus the likelihood of an accident during travel cannot help but increase.

BRIEF SUMMARY

Embodiments of the present invention relate to an alignment method and system for a radar of a vehicle, which can automatically detect a vertical or horizontal misalignment of a radar mounted to a vehicle and can alarm a driver or automatically correct the misalignment.

In accordance with one aspect of the present invention, there is provided a vertical alignment method for a radar of a vehicle, including the steps of: radiating radio wave to a forward ground by a radar which is installed on the vehicle; receiving reflected wave which is reflected from the ground; and determining whether or not a vertical misalignment of the radar occurs, based on the reflected wave.

The step of determining whether or not a vertical misalignment of the radar occurs may be implemented based on a frequency spectrum of the reflected wave.

The step of determining whether or not a vertical misalignment of the radar occurs may include the steps of: calculating a vertical deviation angle of the radar based on the frequency spectrum of the reflected wave; and checking whether or not the vertical deviation angle is larger than a predetermined threshold value. The vertical deviation angle may be determined by a distance between the radar and the forward ground that is obtained by the frequency spectrum of the reflected wave.

The method may further include the step of alarming a driver in the case where it is determined that the vertical misalignment occurs.

The method may further include the step of alarming a driver and deactivating the radar in the case where it is determined that the vertical misalignment occurs.

The method may further include the step of compensating for the vertical deviation angle of the radar in the case where it is determined that the vertical misalignment occurs. The step of compensating for the vertical deviation angle of the radar may be implemented in such a way as to compensate for an array factor of a transmission antenna of the radar to thereby compensate for the vertical deviation angle in terms of software or physically compensate for the vertical deviation angle of the radar through driving a motor.

In accordance with another aspect of the present invention, there is provided a vertical alignment system for a radar of a vehicle, including: a radar mounted to a vehicle and configured to radiate radio wave to a forward ground and receive reflected wave; and a misalignment determination unit configured to determine whether or not a vertical misalignment of the radar occurs, based on the reflected wave.

The misalignment determination unit may determine whether or not a vertical misalignment of the radar occurs, based on a frequency spectrum of the reflected wave.

The misalignment determination unit may calculate a vertical deviation angle based on the frequency spectrum of the reflected wave, and determine whether or not a vertical misalignment of the radar occurs, by comparing the vertical deviation angle with a predetermined threshold value.

The vertical deviation angle may be determined by a distance between the radar and the forward ground that is obtained by the frequency spectrum of the reflected wave.

The system may further include an alarm unit configured to alarm a driver in response to a misalignment determination result from the misalignment determination unit.

The system may further include a compensation unit configured to compensate for the vertical deviation angle in response to a misalignment determination result from the misalignment determination unit. The compensation unit may compensate for an array factor of a transmission antenna of the radar to thereby compensate for the vertical deviation angle in terms of software, or physically compensate for the vertical deviation angle of the radar through driving a motor.

In accordance with another aspect of the present invention, there is provided a horizontal alignment method for a radar of a vehicle, including the steps of: receiving a first horizontal slope from a first horizontal slope sensor installed in the radar of the vehicle and a second horizontal slope from a second horizontal slope sensor installed in a sensor cluster of the vehicle; and determining whether or not a horizontal misalignment of the radar occurs, based on the first horizontal slope and the second horizontal slope.

The step of determining whether or not a horizontal misalignment of the radar occurs may include the steps of: calculating a difference between the first horizontal slope and the second horizontal slope; and checking whether or not the difference between the first horizontal slope and the second horizontal slope is larger than a predetermined horizontal slope threshold value.

The method may further include the step of alarming a driver in the case where it is determined that the horizontal misalignment occurs.

The method may further include the step of compensating for a horizontal deviation angle of the radar in the case where it is determined that the horizontal misalignment occurs.

The step of compensating for the horizontal deviation angle of the radar may be implemented in such a way as to compensate for an array factor of a transmission antenna of the radar to thereby compensate for the horizontal deviation angle in terms of software or physically compensate for the horizontal deviation angle of the radar through driving a motor.

In accordance with another aspect of the present invention, there is provided a vertical alignment method for a radar of a vehicle, including the steps of: receiving a first vertical slope from a first vertical slope sensor installed in the radar of the vehicle and a second vertical slope from a second vertical slope sensor installed in a sensor cluster of the vehicle; and determining whether or not a vertical misalignment of the radar occurs, based on the first vertical slope and the second vertical slope.

The step of determining whether or not a vertical misalignment of the radar occurs may include the steps of: calculating a difference between the first vertical slope and the second vertical slope; and checking whether or not the difference between the first vertical slope and the second vertical slope is larger than a predetermined vertical slope threshold value.

The method may further include the step of alarming a driver in the case where it is determined that the vertical misalignment occurs.

The method may further include the step of compensating for a vertical deviation angle of the radar in the case where it is determined that the vertical misalignment occurs.

The step of compensating for the vertical deviation angle of the radar may be implemented in such a way as to compensate for an array factor of a transmission antenna of the radar to thereby compensate for the vertical deviation angle in terms of software or physically compensate for the vertical deviation angle of the radar through driving a motor.

DETAILED DESCRIPTION

Hereinafter, embodiments of the present invention will be described with reference to accompanying drawings. However, the embodiments are for illustrative purposes only and are not intended to limit the scope of the invention.

Figure 1:
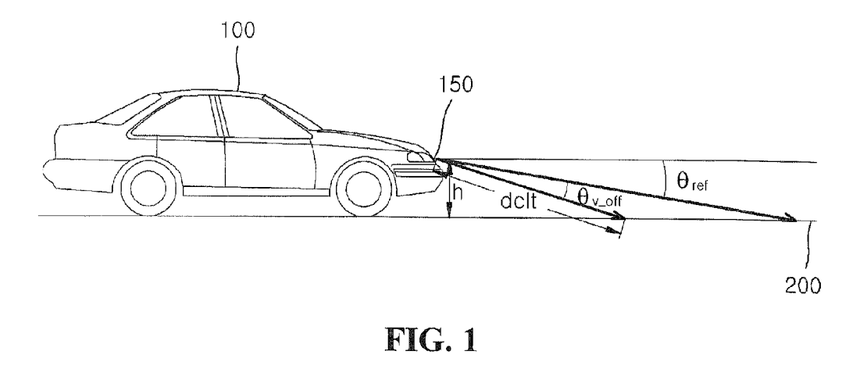
FIG. 1 is a conceptual view explaining a vertical alignment method and system for a radar of a vehicle in accordance with a first embodiment of the present invention.
Figure 2:
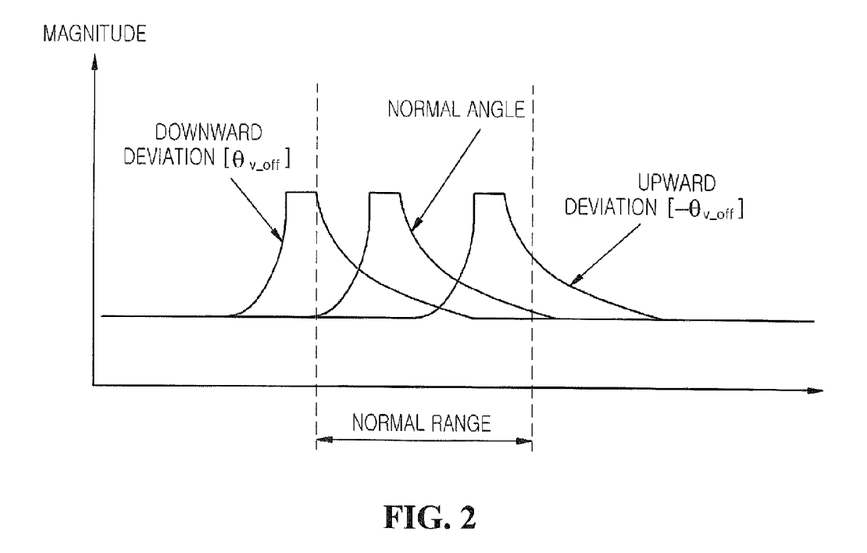
FIG. 2 is a graph showing a frequency spectrum of a reflected wave depending upon a radio wave radiation angle of a radar of a vehicle.
Figure 3:
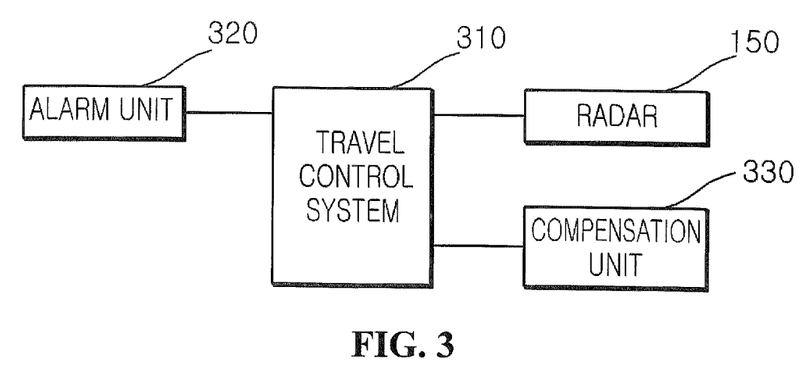
FIG. 3 is a schematic block diagram showing the configuration of the vertical alignment system for a radar of a vehicle according to the first embodiment of the present invention.
Figure 4:
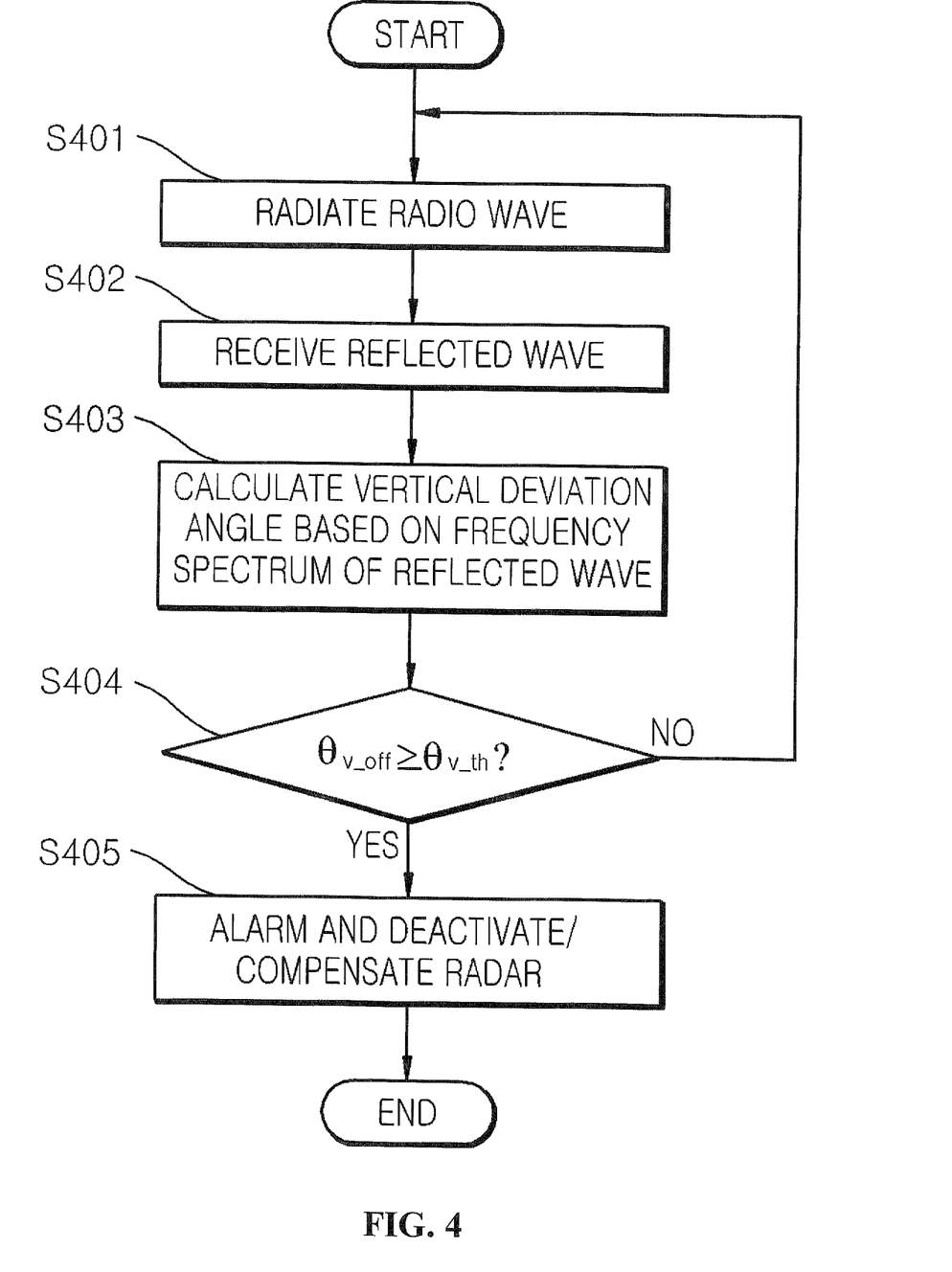
FIG. 4 is a flow chart showing the vertical alignment method for a radar of a vehicle according to the first embodiment of the present invention.

FIG. 1 is a conceptual view explaining a vertical alignment method and system for a radar of a vehicle in accordance with a first embodiment of the present invention, FIG. 2 is a graph showing a frequency spectrum of a reflected wave depending upon a radio wave radiation angle of a radar of a vehicle, FIG. 3 is a schematic block diagram showing the configuration of the vertical alignment system for a radar of a vehicle according to the first embodiment of the present invention, and FIG. 4 is a flow chart showing the vertical alignment method for a radar of a vehicle according to the first embodiment of the present invention. A first embodiment of the present invention will be described below with reference to FIGS. 1 to 4.

Referring to FIG. 3, a vertical alignment system for a radar of a vehicle in accordance with a first embodiment of the present invention includes a radar 150 mounted to a vehicle 100 and configured to radiate radio wave to a forward ground 200 and receive reflected wave; a travel control system 310 configured to determine whether or not a vertical misalignment of the radar 150 occurs, based on the reflected wave; an alarm unit 320 configured to alarm a driver in response to a misalignment determination result from the travel control system 310; and a compensation unit 330 configured to compensate for a vertical deviation angle of the radar 150 in response to the misalignment determination result from the travel control system 310.

Hereafter, operations of the vertical alignment system for a radar of a vehicle according to the first embodiment of the present invention will be described with reference to FIGS. 1 to 4.

First, the radar 150 installed on the vehicle 100 radiates radio wave to the forward ground 200 (S401). At this time, the radio wave is radiated in such a way as to define a predetermined angle between a straightforward direction and the ground 200 as shown in FIG. 1. If the radar 150 is normally aligned in the vertical direction, the radio wave is radiated while defining an angle of $\theta_{ref}$ in FIG. 1 that is stored in advance in the travel control system 310 and the like. As the radiated radio wave, various kinds of radio wave may be used depending upon a type of a transmission antenna of the radar 150. For example, in the case where a transmission antenna with one antenna element is used, by configuring the single element in such a manner that a field of view (FOV) in the range of which the radio wave is radiated can be widened in the vertical direction, the radio wave can be radiated to the ground. Also, in the case where an array antenna with at least two antenna elements is used, by forming a side beam (side lobe) directed toward the ground separately from a main beam (main lobe) directed straightforward toward a target, the radio wave can be radiated to the ground. This can be realized by appropriately designing an array factor of the array antenna.

Then, the radar 150 receives the reflected wave which is reflected from the ground 200 upon radiation of the radio wave (S402). In the present embodiment, a frequency spectrum, for example, a clutter spectrum, of the received reflected wave may be used as shown in FIG. 2.

Next, the travel control system 310 determines whether or not a vertical misalignment of the radar 150 occurs, based on the reflected wave, in particular, the frequency spectrum of the reflected wave. To this end, the travel control system 310 first calculates a vertical deviation angle of the radar 150 based on the frequency spectrum of the reflected wave (S403). In detail, as described above, if the radar 150 is normally aligned in the vertical direction, the radio wave is radiated while defining the angle of $\theta_{ref}$ in FIG. 1. However, if the radar 150 is misaligned upward or downward in the vertical direction, the radio wave is radiated while being deviated by a certain deviation angle $\theta_{v\_off}$ as shown in FIG. 1. The deviation angle $\theta_{v\_off}$ can be calculated from a distance $d_{clt}$ between the radar 150 and the ground 200, which will be described below in detail.

First, the distance $d_{clt}$ between the radar 150 and the forward ground 200 can be obtained from the frequency spectrum of the reflected wave shown in FIG. 2. That is to say, when observing the frequency spectrum, in particular, the clutter spectrum, of the reflected wave shown in FIG. 2, in the case where the radar 150 is aligned in a normal range, the frequency spectrum of the radar 150 is also detected in the "normal range" as shown in FIG. 2. However, if the radar 150 goes beyond the normal range and is deviated downward in the vertical direction so that the distance $d_{clt}$ decreases, the frequency spectrum of the reflected wave is distributed in a lower frequency range than the normal range as shown in FIG. 2. Further, if the radar 150 goes beyond the normal range and is deviated upward in the vertical direction so that the distance $d_{clt}$ increases, the frequency spectrum of the reflected wave is distributed in a higher frequency range than the normal range as shown in FIG. 2. Accordingly, by measuring a degree to which a certain wave form goes beyond the normal range of the frequency on the frequency spectrum of the reflected wave, the distance $d_{clt}$ between the radar 150 and the forward ground 200 can be measured.

The deviation angle $\theta_{v\_off}$ is calculated as in the following Mathematical Equations 1 and 2.

$$\sin(\theta_{ref} + \theta_{v\text{-}off}) = \frac{h}{d_{clt}} \quad \text{Mathematical Equation 1}$$

$$\theta_{v\text{-}off} = \sin^{-1}\left(\frac{h}{d_{clt}}\right) - \theta_{ref} \quad \text{Mathematical Equation 2}$$

In the above Mathematical Equations, if $\theta_{v\_off}$ is positive (+), it represents that the radar 150 is deviated downward from a reference position, and if $\theta_{v\_off}$ is negative (−), it represents that the radar 150 is deviated upward from the reference position.

The travel control system 310 checks whether or not the deviation angle $\theta_{v\_off}$ (precisely, the absolute value of $\theta_{v\_off}$) is larger than a predetermined threshold value $\theta_{v\_th}$ (S404). If the deviation angle $\theta_{v\_off}$ is larger than the predetermined threshold value $\theta_{v\_th}$, it is determined that the radar 150 is misaligned in the vertical direction and the sequence proceeds to step S405. If the deviation angle $\theta_{v\_off}$ is not larger than the predetermined threshold value $\theta_{v\_th}$, the sequence returns to the step S401 so that the above-described steps are repeated.

In the case where it is determined in the step S404 that the radar 150 is misaligned in the vertical direction, it is alarmed to a driver that the radar 150 is misaligned in the vertical direction, the alarm is made and the radar 150 is deactivated, or the vertical deviation angle $\theta_{v\_off}$ of the radar 150 is compensated for (S405). In other words, when it is determined that the radar 150 is misaligned in the vertical direction, the travel control system 310 may cause the alarm unit 320 to issue an alarm to the driver through a sound or a visual display, and in addition, may deactivate the radar 150.

Moreover, when it is determined that the radar 150 is misaligned in the vertical direction, the travel control system 310 may cause the compensation unit 330 to compensate for the vertical deviation angle $\theta_{v\_off}$ of the radar 150. In this case, the compensation of the vertical deviation angle $\theta_{v\_off}$ may be implemented in such a way as to compensate for an array factor of a transmission antenna of the radar 150 to thereby compensate for the vertical deviation angle $\theta_{v\_off}$ in terms of software or physically compensate for the vertical deviation angle $\theta_{v\_off}$ of the radar 150 through driving a motor (not shown). Namely, by compensating for or correcting the array factor of the transmission antenna in terms of software, the radiation direction of the radio wave or a main beam and a side beam radiated from the radar 150 may be corrected. Otherwise, a driving unit, such as a step motor, installed on the radar 150 may be used to physically correct the radiation direction of the radar 150.

Thus, the alignment method and system for a radar of a vehicle in accordance with the first embodiment of the present invention can automatically detect a vertical or horizontal misalignment of a radar mounted to the front part of a vehicle and can alarm a driver or automatically correct the misalignment.

Figure 5:
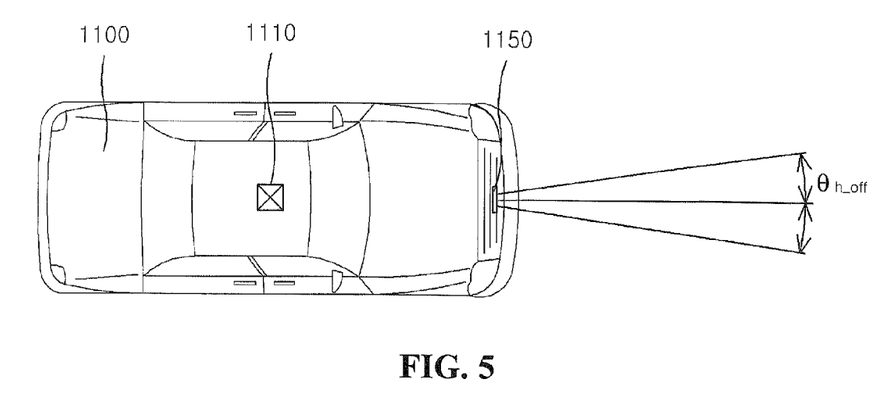
FIG. 5 is a conceptual view explaining a horizontal alignment method for a radar of a vehicle in accordance with a second embodiment of the present invention.
Figure 6:
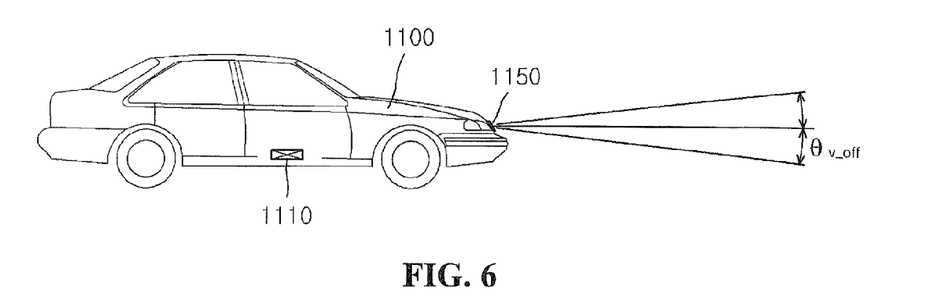
FIG. 6 is a conceptual view explaining a vertical alignment method for a radar of a vehicle in accordance with a third embodiment of the present invention.
Figure 7:
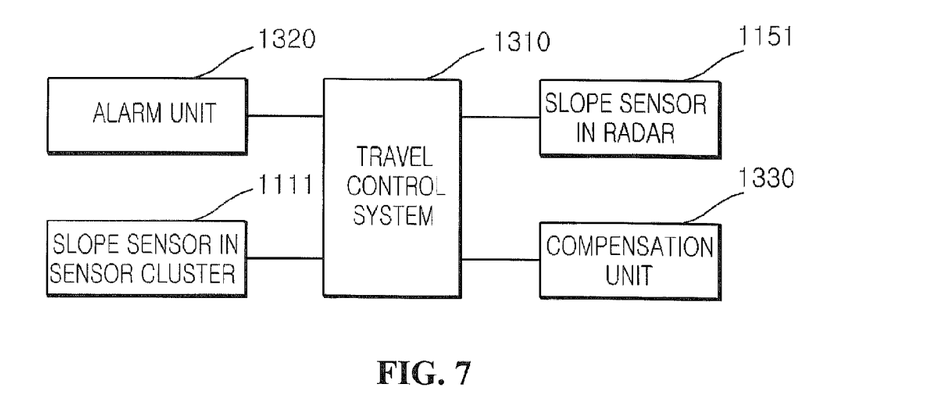
FIG. 7 is a schematic block diagram showing the configuration of a horizontal or vertical alignment system for a radar of a vehicle according to the second and third embodiments of the present invention.
Figure 8:
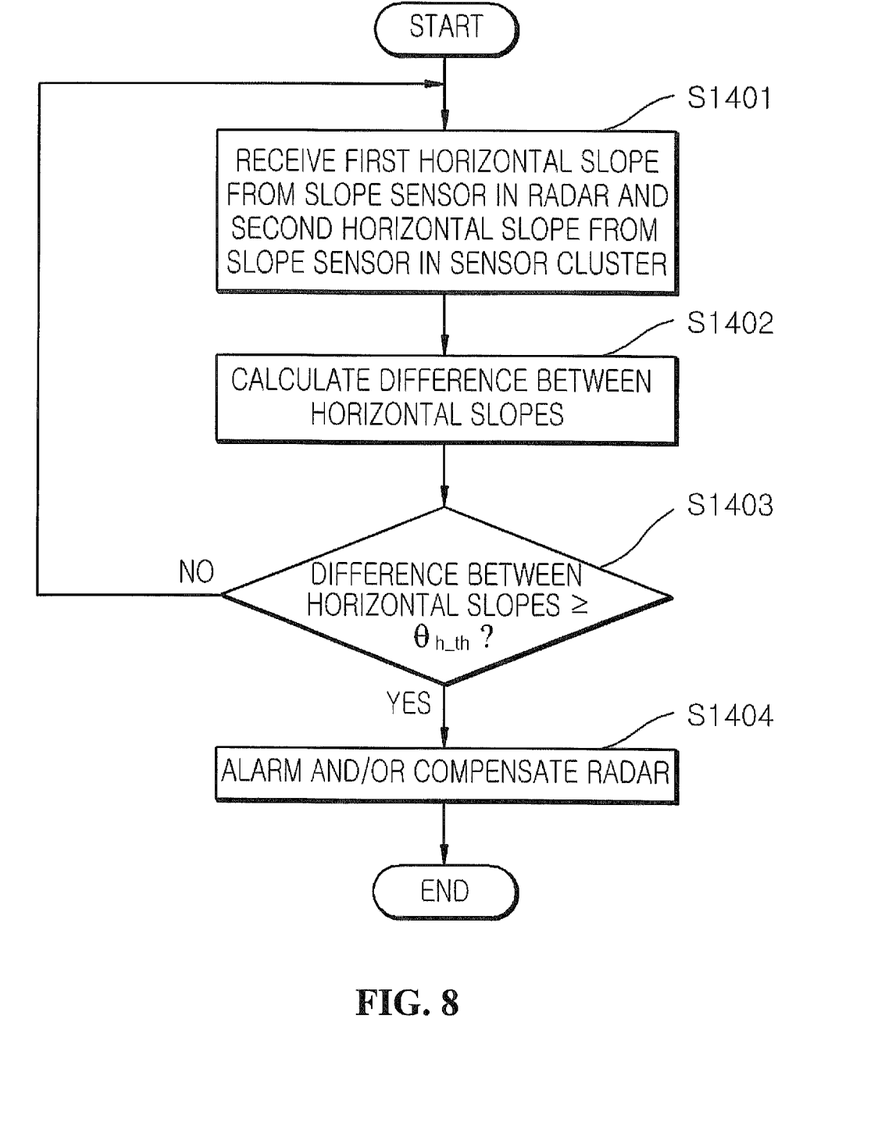
FIG. 8 is a flow chart showing the horizontal alignment method for a radar of a vehicle according to the second embodiment of the present invention.
Figure 9:
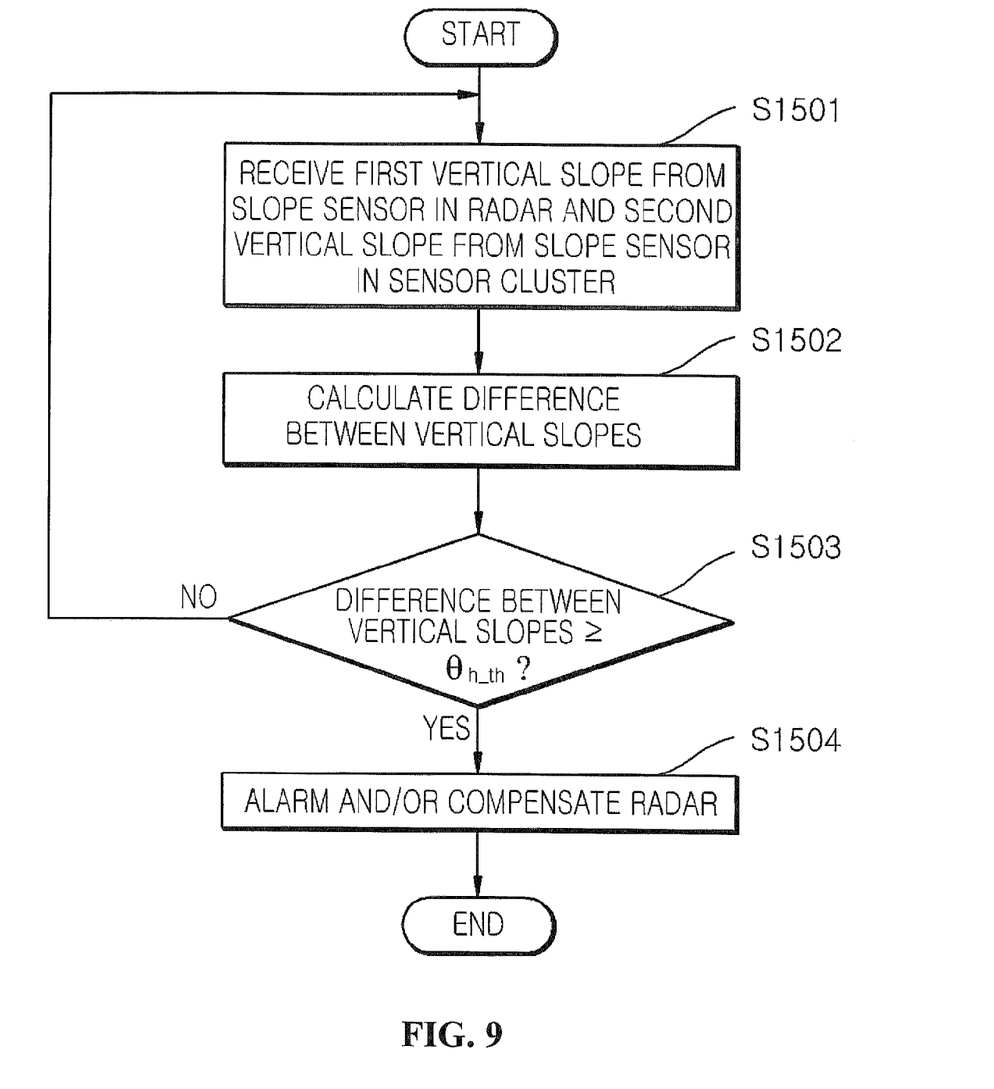
FIG. 9 is a flow chart showing the vertical alignment method for a radar of a vehicle according to the third embodiment of the present invention.

FIG. 5 is a conceptual view explaining a horizontal alignment method for a radar of a vehicle in accordance with a second embodiment of the present invention, FIG. 6 is a conceptual view explaining a vertical alignment method for a radar of a vehicle in accordance with a third embodiment of the present invention, FIG. 7 is a schematic block diagram showing the configuration of a horizontal or vertical alignment system for a radar of a vehicle according to the second and third embodiments of the present invention, FIG. 8 is a flow chart showing the horizontal alignment method for a radar of a vehicle according to the second embodiment of the present invention, and FIG. 9 is a flow chart showing the vertical alignment method for a radar of a vehicle according to the third embodiment of the present invention.

Referring to FIG. 7, a horizontal or vertical alignment system for a radar of a vehicle according to second and third embodiments of the present invention includes a horizontal or vertical slope sensor 1151 installed in a radar 1150 of a vehicle 1100; a horizontal or vertical slope sensor 1111 installed in a sensor cluster 1110 of the vehicle 1100; a travel control system 1310 configured to determine whether or not a horizontal or vertical misalignment of the radar 1150 occurs, based on a first horizontal or vertical slope from the horizontal or vertical slope sensor 1151 and a second horizontal or vertical slope from the horizontal or vertical slope sensor 1111; an alarm unit 1320 configured to alarm a driver in response to a misalignment determination result from the travel control system 1310; and a compensation unit 1330 configured to compensate for a horizontal or vertical deviation angle of the radar 1150 in response to the misalignment determination result from the travel control system 1310.

First, a horizontal alignment method for a radar of a vehicle in accordance with the second embodiment of the present invention will be described below with reference to FIGS. 5, 7 and 8.

A first horizontal slope is received from the slope sensor installed in the radar 1150 of the vehicle 1100, in particular, the horizontal slope sensor 1151, and a second horizontal slope is received from the slope sensor installed in the sensor cluster 1110 of the vehicle 1100, in particular, the horizontal slope sensor 1111 (S1401). The horizontal slope sensor 1151 is mounted in the radar 1150 which is installed at an appropriate position of the vehicle 1100, and senses a leftward and rightward slope when viewed in the horizontal direction, that is, in the straightforward direction of the vehicle 1100. Therefore, the horizontal slope sensor 1151 senses a degree to which the radar 1150 is deviated from the horizontal direction.

Also, the horizontal slope sensor 1111 is mounted in the sensor cluster 1110 of the vehicle 1100, and senses a leftward and rightward slope when viewed in the horizontal direction, that is, in the straightforward direction of the vehicle 1100. Therefore, the horizontal slope sensor 1111 senses a degree to which the body of the vehicle 1100 is deviated from the horizontal direction. The sensor cluster 1110 is mainly installed under a console box which is positioned near the center of gravity of the vehicle 1100, and has various sensors mounted therein.

Next, the travel control system 1310 determines whether or not a horizontal misalignment of the radar 1150 occurs, based on the first horizontal slope and the second horizontal slope. Describing this in a stepwise manner, the travel control system 1310 calculates a difference between the first horizontal slope and the second horizontal slope (S1402). Then, the travel control system 1310 checks whether or not the difference between the first horizontal slope and the second horizontal slope is larger than a predetermined threshold value $\theta_{h\_th}$, and thereby determines whether or not the misalignment occurs (S1403). That is to say, if the difference between the first horizontal slope and the second horizontal slope is larger than a predetermined threshold value $\theta_{h\_th}$, it represents that the radar 1150 is deviated no less than a predetermined degree with respect to the straightforward horizontal direction of the vehicle 1100. Through this, the travel control system 1310 may determine whether or not a horizontal misalignment of the radar 1150 occurs. If it is determined as a determination result of the step S1403 that a misalignment occurs, the sequence proceeds to step S1404. Otherwise, the sequence returns to the step S1401 so that the above-described steps are repeated.

In the case where it is determined in the step S1403 that a horizontal misalignment of the radar 1150 occurs, it is alarmed to a driver that the radar 1150 is misaligned in the horizontal direction, and a horizontal deviation angle $\theta_{h\_off}$ of the radar 1150 is compensated for (S1404). In other words, when it is determined that the radar 1150 is misaligned in the horizontal direction, the travel control system 1310 may cause the alarm unit 1320 to issue an alarm to the driver through a sound or a visual display. Further, when it is determined that the radar 1150 is misaligned in the horizontal direction, the travel control system 1310 may cause the compensation unit 1330 to compensate for the horizontal deviation angle $\theta_{h\_off}$ of the radar 1150. In this case, the compensation of the horizontal deviation angle $\theta_{h\_off}$ may be implemented in such a way as to compensate for an array factor of a transmission antenna of the radar 1150 to thereby compensate for the horizontal deviation angle $\theta_{h\_off}$ in terms of software or physically compensate for the horizontal deviation angle $\theta_{h\_off}$ of the radar 1150 through driving a motor (not shown). Namely, by compensating for or correcting the array factor of the transmission antenna in terms of software, the radiation direction of the radio wave or a main beam and a side beam radiated from the radar 1150 may be corrected. Or, a driving unit, such as a step motor, installed on the radar 1150 may be used to physically correct the radiation direction of the radar 1150.

Thus, the alignment method and system for a radar of a vehicle in accordance with the second embodiment of the present invention can automatically detect a horizontal misalignment of a radar mounted to a vehicle and can alarm a driver or automatically correct the misalignment.

Next, a vertical alignment method for a radar of a vehicle in accordance with the third embodiment of the present invention will be described below with reference to FIGS. 6, 7 and 9. Descriptions for the same components as those of the second embodiment will be omitted herein.

A first vertical slope is received from the slope sensor installed in the radar 1150 of the vehicle 1100, in particular, the vertical slope sensor 1151, and a second vertical slope is received from the slope sensor installed in the sensor cluster 1110 of the vehicle 1100, in particular, the vertical slope sensor 1111 (S1501). The vertical slope sensor 1151 is mounted in the radar 1150, and senses an upward and downward slope when viewed in the vertical direction, that is, in the upward and downward direction of the vehicle 1100. Therefore, the vertical slope sensor 1151 senses a degree to which the radar 1150 is deviated from the vertical direction.

Also, the vertical slope sensor 1111 is mounted in the sensor cluster 1110 of the vehicle 1100, and senses an upward and downward slope when viewed in the vertical direction, that is, in the upward and downward direction of the vehicle 1100. Therefore, the vertical slope sensor 1111 senses a degree to which the body of the vehicle 1100 is deviated from the vertical direction.

Next, the travel control system 1310 determines whether or not a vertical misalignment of the radar 1150 occurs, based on the first vertical slope and the second vertical slope. Describing this in a stepwise manner, the travel control system 1310 calculates a difference between the first vertical slope and the second vertical slope (S1502). Then, the travel control system 1310 checks whether or not the difference between the first vertical slope and the second vertical slope is larger than a predetermined threshold value $\theta_{v\_th}$, and thereby determines whether or not the misalignment occurs (S1503). That is to say, if the difference between the first vertical slope and the second vertical slope is larger than a predetermined threshold value $\theta_{v\_th}$, it represents that the radar 1150 is deviated no less than a predetermined degree with respect to the vertical direction of the vehicle 1100. Through this, the travel control system 1310 may determine whether or not a vertical misalignment of the radar 1150 occurs. If it is determined as a determination result of the step S1503 that a misalignment occurs, the sequence proceeds to step S1504. Otherwise, the sequence returns to the step S1501 so that the above-described steps are repeated.

In the case where it is determined in the step S1503 that a vertical misalignment of the radar 1150 occurs, it is alarmed to a driver that the radar 1150 is misaligned in the vertical direction, and a vertical deviation angle $\theta_{v\_off}$ of the radar 1150 is compensated for (S1504). In other words, when it is determined that the radar 1150 is misaligned in the vertical direction, the travel control system 1310 may cause the alarm unit 1320 to issue an alarm to the driver through a sound or a visual display. Further, when it is determined that the radar 1150 is misaligned in the vertical direction, the travel control system 1310 may cause the compensation unit 1330 to compensate for the vertical deviation angle $\theta_{v\_off}$ of the radar 1150. In this case, the compensation of the vertical deviation angle $\theta_{v\_off}$ may be implemented in such a way as to compensate for an array factor of a transmission antenna of the radar 1150 to thereby compensate for the vertical deviation angle $\theta_{v\_off}$ in terms of software or physically compensate for the vertical deviation angle $\theta_{v\_off}$ of the radar 1150 through driving a motor (not shown). Namely, by compensating for or correcting the array factor of the transmission antenna in terms of software, the radiation direction of the radio wave or a main beam and a side beam radiated from the radar 1150 may be corrected. Otherwise, a driving unit, such as a step motor, installed on the radar 1150 may be used to physically correct the radiation direction of the radar 1150.

Thus, the alignment method and system for a radar of a vehicle in accordance with the third embodiment of the present invention can automatically detect a vertical misalignment of a radar mounted to a vehicle and can alarm a driver or automatically correct the misalignment.

As is apparent from the above descriptions, the alignment method and system for a radar of a vehicle according to the present invention provide advantages in that it is possible to automatically detect a vertical or horizontal misalignment of a radar mounted to a vehicle and to alarm a driver or automatically correct the misalignment.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A vertical alignment method for a radar of a vehicle, comprising the steps of:
    radiating a first radio wave to a forward ground by a radar which is installed on the vehicle, the first radio wave subsequently being reflected by the forward ground;
    receiving the reflected wave of the first radio wave; and
    determining whether a vertical misalignment of the radar occurs, based on the reflected wave;
    wherein the step of determining whether a vertical misalignment of the radar occurs comprises determining a distance between the radar and the forward ground by determining a degree to which a measured frequency range is shifted relative to a predetermined frequency range measured at a time prior to measurement of the measured frequency range on a frequency spectrum of the reflected wave and wherein the predetermined frequency range is determined by radiating a second radio wave at a predetermined angle and the predetermined frequency range is determined at this point in time.

2. The method according to claim 1, wherein the step of determining whether a vertical misalignment of the radar occurs is implemented based on the frequency spectrum of the reflected wave.

3. The method according to claim 2, wherein the step of determining whether or not a vertical misalignment of the radar occurs comprises the steps of:
    calculating a vertical deviation angle of the radar based on the frequency spectrum of the reflected wave; and
    checking whether or not the vertical deviation angle is larger than a predetermined threshold value.

4. The method according to claim 3, wherein the vertical deviation angle is determined by the distance between the radar and the forward ground that is obtained by the frequency spectrum of the reflected wave.

5. The method according to claim 1, further comprising the step of:
    alarming a driver in the case where it is determined that the vertical misalignment occurs.

6. The method according to claim 1, further comprising the step of:
    alarming a driver and deactivating the radar in the case where it is determined that the vertical misalignment occurs.

7. The method according to claim 1, further comprising the step of:
    compensating for the vertical deviation angle of the radar in the case where it is determined that the vertical misalignment occurs.

8. The method according to claim 7, wherein the step of compensating for the vertical deviation angle of the radar is implemented in such a way as to compensate for an array factor of a transmission antenna of the radar to thereby compensate for the vertical deviation angle in terms of software or physically compensate for the vertical deviation angle of the radar.

9. The method according to claim 1,
    wherein the radar comprises an array antenna which has at least two antenna elements, and
    wherein the first radio wave radiated to the forward ground comprises a side beam.

10. A vertical alignment system for a radar of a vehicle, comprising:
    a radar mounted to a vehicle and configured to radiate a first radio wave to a forward ground and receive a reflected wave when the first radio wave is reflected by the forward ground; and
    a misalignment determination unit configured to determine whether a vertical misalignment of the radar occurs, based on the reflected wave;
    wherein determining whether a vertical misalignment of the radar occurs comprises determining a distance between the radar and the forward ground by determining a degree to which a measured frequency range is shi fled relative to a predetermined frequency range measured at a time prior to measurement of the measured frequency range on a frequency spectrum of the reflected wave and wherein the predetermined frequency range is determined by radiating a second radio wave at a predetermined angle and the predetermined frequency range is determined at this point in time.

11. The system according to claim 10, wherein the misalignment determination unit determines whether a vertical misalignment of the radar occurs, based on the frequency spectrum of the reflected wave.

12. The system according to claim 11, wherein the misalignment determination unit calculates a vertical deviation angle based on the frequency spectrum of the reflected wave, and determines whether or not a vertical misalignment of the radar occurs, by comparing the vertical deviation angle with a predetermined threshold value.

13. The system according to claim 12, wherein the vertical deviation angle is determined by the distance between the radar and the forward ground that is obtained by the frequency spectrum of the reflected wave.

14. The system according to claim 10, further comprising:
an alarm unit configured to alarm a driver in response to a misalignment determination result from the misalignment determination unit.

15. The system according to claim 10, further comprising:
a compensation unit configured to compensate for the vertical deviation angle in response to a misalignment determination result from the misalignment determination unit.

16. The system according to claim 15, wherein the compensation unit compensates for an array factor of a transmission antenna of the radar to thereby compensate for the vertical deviation angle in terms of software, or physically compensates for the vertical deviation angle of the radar.

17. The system according to claim 10,
wherein the radar comprises an array antenna which has at least two antenna elements, and
wherein the first radio wave radiated to the forward ground comprises a side beam.

* * * * *